United States Patent Office 3,347,572
Patented Oct. 17, 1967

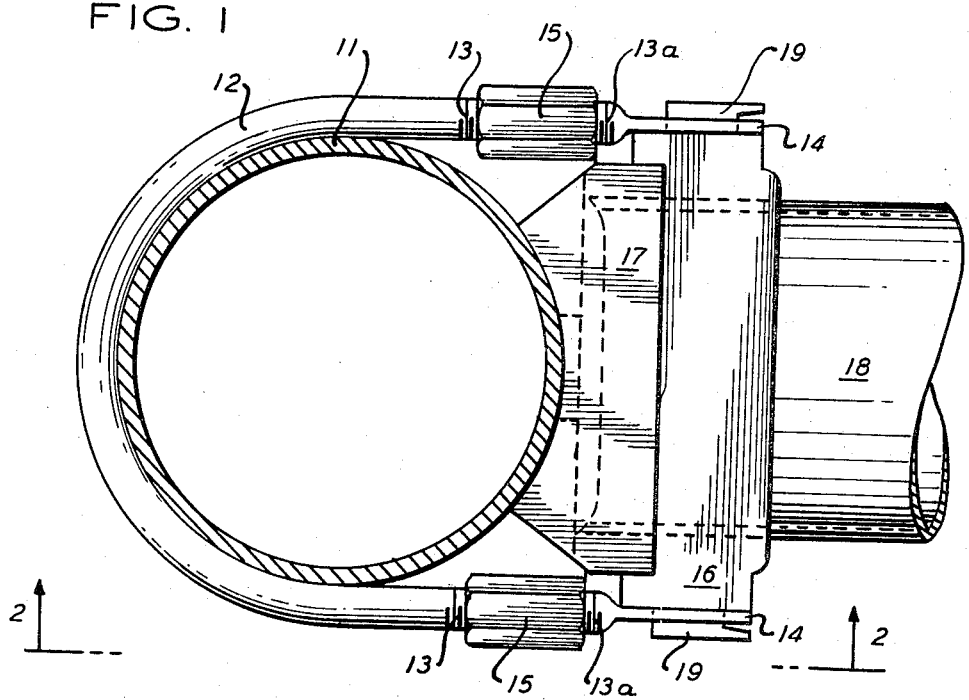
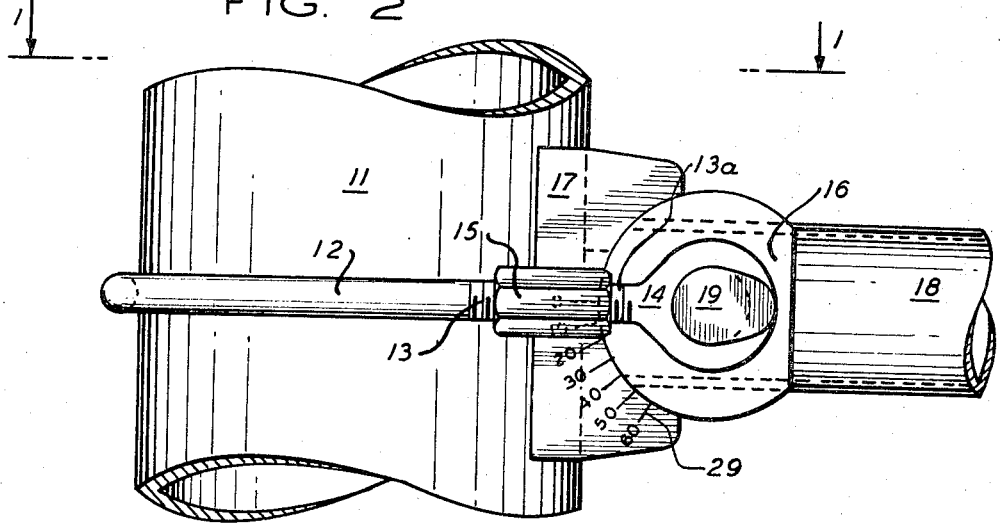

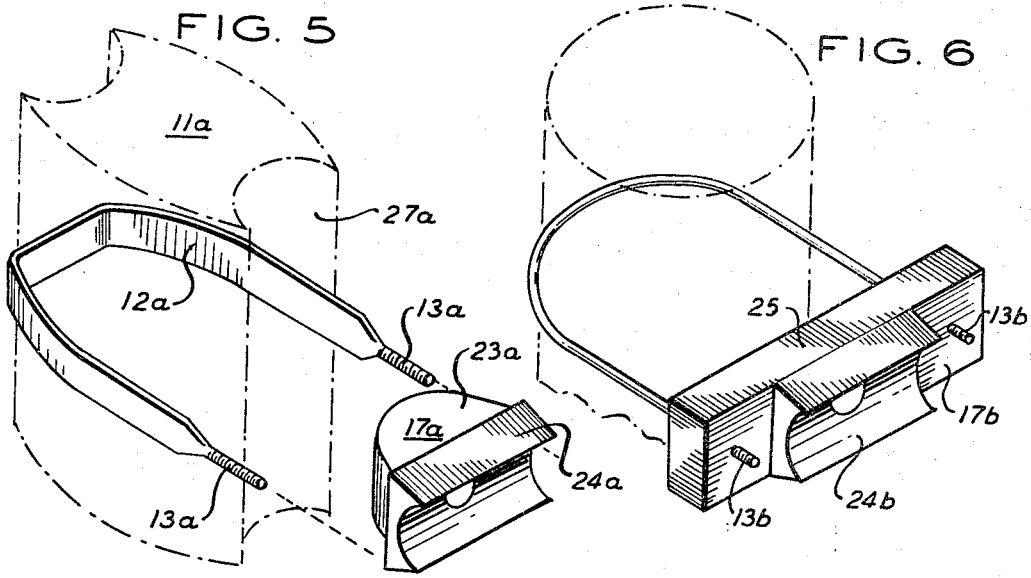
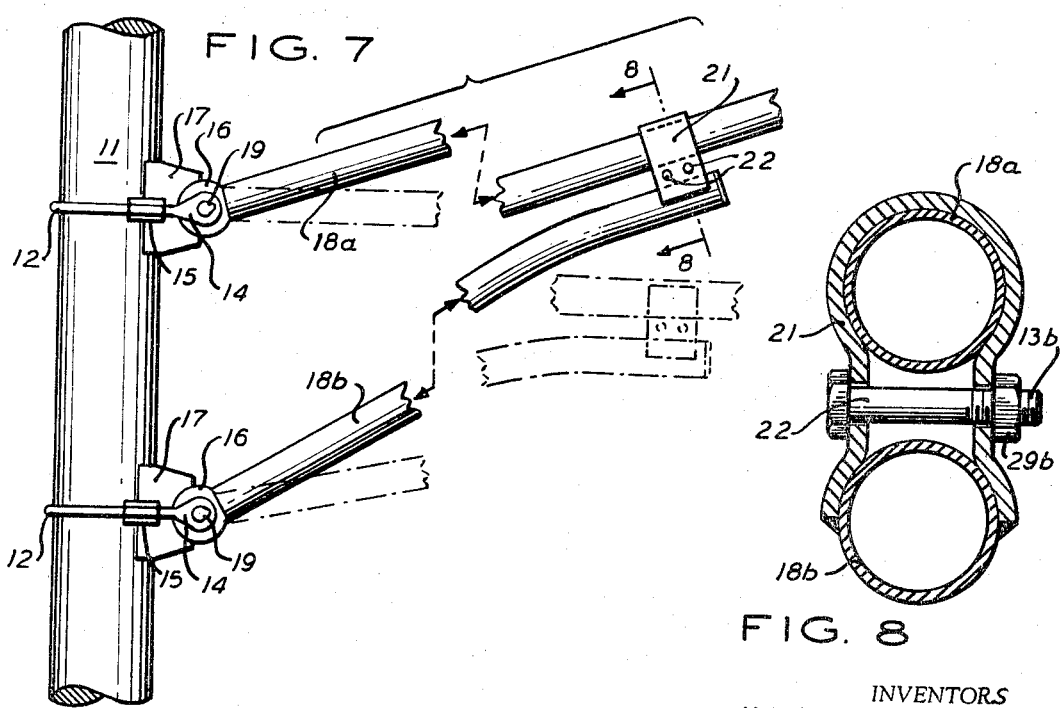

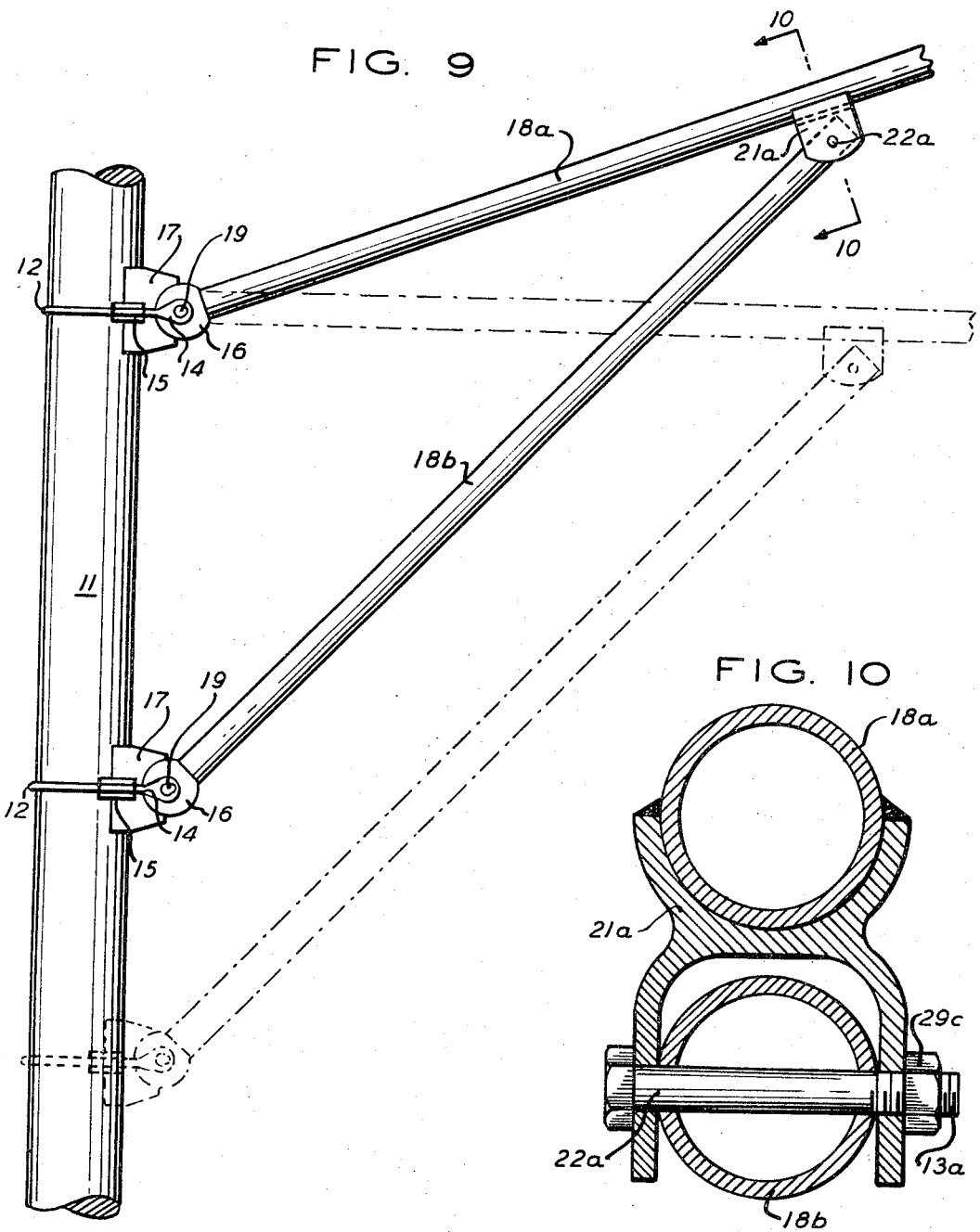
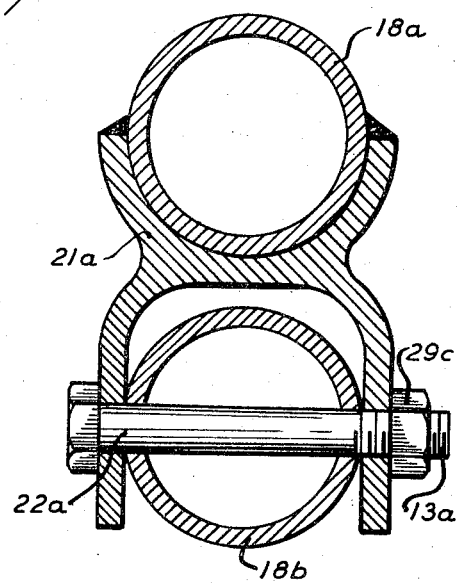

3,347,572
ADJUSTABLE MECHANISM FOR SECURING
ARMS TO A POST
Henry C. Pfaff, Jr., Summit, and Francis G. Schlosser,
Ridgefield Park, N.J., assignors to Pfaff and Kendall,
Newark, N.J., a corporation of New Jersey
Filed Nov. 2, 1964, Ser. No. 408,063
5 Claims. (Cl. 287—14)

ABSTRACT OF THE DISCLOSURE

Means for adjustably securing arms to poles such as lighting and traffic poles in outwardly extending relation, so as to enable precise angular adjustment and positioning to be achieved.

---

This invention relates to the art of posts or shafts, used for supporting traffic and street lights and other structures, and is more particularly directed to novel means for the angular setting and adjustment of arms or other supports or parts thereof positioned on such posts.

It has been common to mount arms for lighting and other devices fixedly to posts. Where it was desired to change the position of an arm, for example, special holes or other means had to be provided, and different post space was utilized in changing the position of a mounted device.

It is the object of this invention to avoid the foregoing and other difficulties in prior practices, by the provision of novel adjustable means for positioning the arm or arms on the post at any desired height above the ground and at a precise desired angle and to enable the changing of the angular position of the arm on the post.

A further object of the invention is to provide adjustable slidable means consisting of readily made standardized parts fitting standard posts, obviating the need for special hardware and special holes. To change the position of the arm and mounted device pursuant to the invention requires merely loosening of the connections between the arm and adjusting movement of the parts to the precise position desired in accordance with visible angular markings, and then readily tightening the parts.

A further object of this invention is to enable usage of limited space on the post for various angular arrangements of the arm or arms on the post.

The drawings, illustrating procedures and devices useful in carrying out the invention, and the description below, are exemplary of the invention, which shall be deemed to cover all other devices and procedures coming within the scope and purview of the appended claims.

Figure 3:
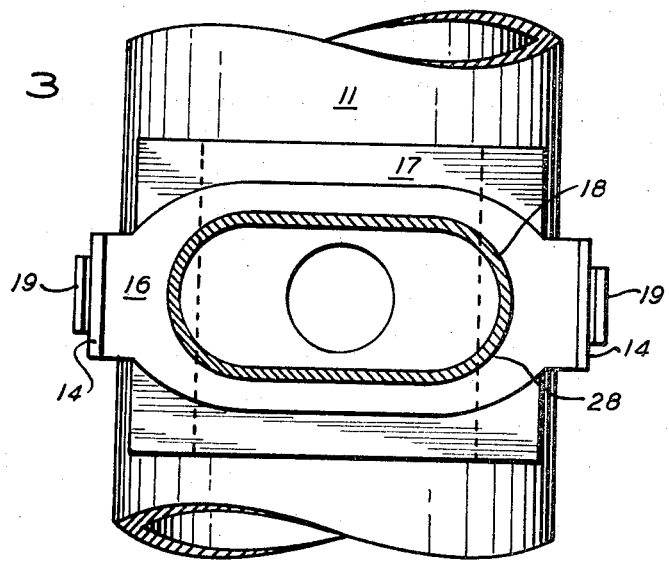
Figure 4:
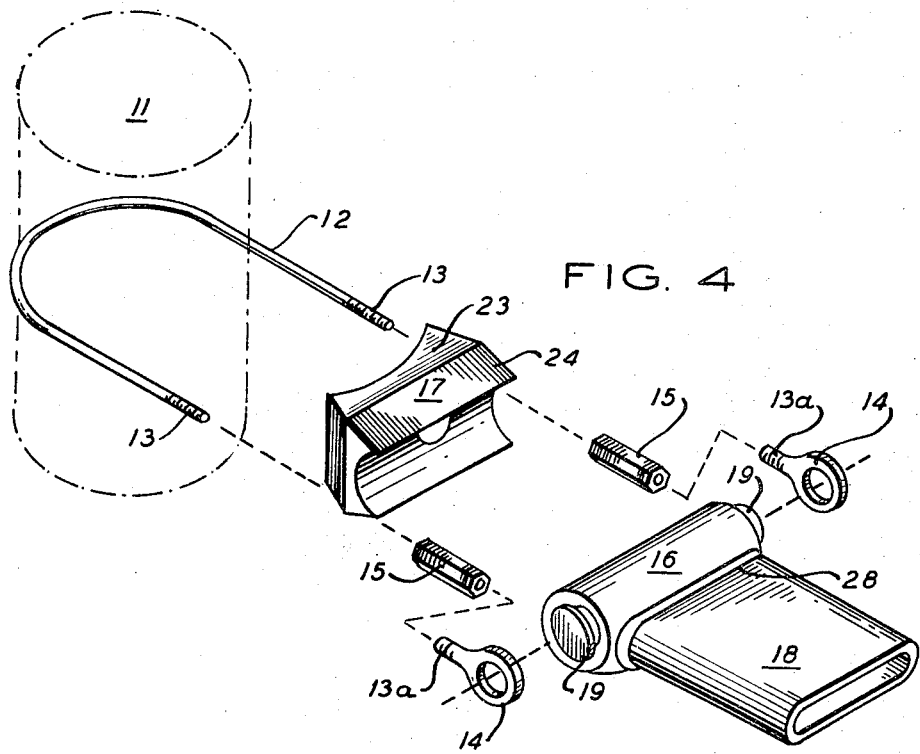

The aforesaid and other objects of the invention, which will become apparent as the description proceeds, are achieved by providing novel clamping, connecting and pivoting means exemplarily shown in the accompanying drawings, wherein:

FIG. 1 is a horizontal, fragmentary, sectional view of a post provided with a mechanism of this invention, taken at line 1—1 of FIG. 2, FIG. 2 is a fragmentary vertical sectional view, taken at line 2—2 of FIG. 1, FIG. 3 is a front sectional view thereof, FIG. 4 is an exploded prespective view of one form of the invention, FIG. 5 is an exploded perspective view of another form, FIG. 6 is a fragmentary perspective view of another form, FIG. 7 is a side elevational, fragmentary view of a post provided with a mechanism of the invention, FIG. 8 is an enlarged vertical sectional view, taken at line 8—8 of FIG. 7, FIG. 9 is a side elevational view of a post provided with a mechanism of the invention, and FIG. 10 is an enlarged vertical sectional view thereof, taken at line 10—10 of FIG. 9.

Referring to the drawings (FIG. 1) the numeral 11 designates a post having a securing member such as a bolt 12 conforming preferably to and embracing said post. Bolt 12 terminates in threaded legs 13 for connection to right-left hand couplings 15, rotated in one direction to tighten or loosen the parts thereby mounted on the post and in a reverse direction for the reverse operation. Eyebolts 14 have threaded legs 13a at their extremities for engagement with the right-left couplings 15. Saddle 17 comprises a post facing side 23 (FIG. 4) and outer or pivot side 24.

In the FIG. 5 embodiment wherein the post 11a is shown with a recess 27, saddle 23a is complementarily shaped; FIG. 6 illustrates a flat saddle 25 which may be used with a flat or round post.

Eyebolts 14 have telescopic or hook-wise engagement with pivot 16 so that rotation of the pivot 16 (to which arm 18a, FIG. 9, is secured) is achieved as a radius drawn from axis point 19. The first arm 18a extends from and is pivotally connected as at axis 19 to pivot 16. Pivot 16 is complementarily shaped to the recess in saddle 17 (FIG. 2) for rotational movement of the pivot 16 in the saddle 17 to thereby adjust and determine the position of arm 18. A bridge member 21 is rigidly secured to one of two arms in the FIGS. 7–8 form, while allowing frictional slidable movement of the other arm therein, final tightening of the parts at the desired positions of the arm being achieved by threading nut 29b on bolt 22.

Eyebolts 14 are (FIGS. 1 and 2) positioned on slotted stud ends 19 of pivot 16, thus enabling the pivot (which is preferably complementarily shaped to the side 24 of saddle 17) to rotate in the eyebolts 14 until final tightening of couplings 15. The opposite face of saddle 17 is preferably formed complementarily to the post, to enable slidable vertical movement of the saddle on the post.

In the FIG. 5 embodiment of the invention, post 11a has semi-cylindrical recess 27a, bolt 12a encircles the post and has threaded legs 13a; saddle 17a has a convex face 23a complementary to recess 27a of post 11a; the opposite side of the saddle is concave to receive pivot member 16 (FIG. 4); the sides of the saddle 17a slope inwardly.

In another embodiment of the invention shown in FIG. 6, the saddle 25 comprises a rectangular plate positioned in abutment with the post and having a concave face 24b to be engaged by a pivot member such as 16 and is secured to the post by bolt or other means terminating in ends 13b engaging means such as connectors 15 (FIG. 4) engaging eyebolts 14, in turn engaging slotted ends 19 of the pivot member.

In another embodiment of the invention shown in FIGS. 7 and 9, arms 18a, 18b connected, at one end to pivot members 16, are interconnected remote from the pivot members 16 by U-shaped bridge members 21, 21a (FIGS. 8 and 10). Bridge member 21 is preferably fixed to one of the arms (18b) (FIG. 8) and slidably receives the other (18a) until final tightening of the connecting piece 21 as by a bolt 22 or the like passing through the center of the bridge member 21.

In another embodiment of the inventilon as shown in FIG. 9, arms 18a and 18b are interconnected remote from their points 19 of connection to the post, by a preferably U-shaped bridge member 21a fixed to one arm (18a, FIG. 10) telescopically slidably receiving the other arm (18b) and finally fixed to the latter by pin or other means 22a passing through a pair of aligned apertures or a selected pair of a series of apertures in the arm 18b.

Pursuant to the invention, as above described, a pair of arms (18a, 18b, FIG. 7) may be rotated from an initial (dotted line) position on the pole to a different (full line) position and fixed at the latter position by bridge member 21.

In the FIG. 9 form, the arms thus may be moved from their initial (dotted line) position on the pole to a different position and fixed at the latter position bridge member 21a.

The angular position of the arm relative to the pole may be precisely set pursuant to the invention by observing (FIG. 2) the angle reading on scale 29 on the saddle 17 indicated with reference to a point or mark on pivot member.

While, in accordance with the patent statutes, several embodiments of the invention have been illustrated and described in detail, it is to be understood that the invention and scope of the appended claims are not limited except as may be required by the prior art.

We claim:

1. In an adjustable mechanism for securing an arm member to a post, said post having a longitudinally extending axis, a saddle member positioned on said post transversely to said axis, said saddle member having an inner and an outer surface, said inner surface being formed complementary to the outer surface of said post and being in adjustable engagement therewith, and an arm member, said arm member having a pivot end, said pivot end and the outer surface of said saddle member having complementary cylindrical surfaces, so that said pivot end will rotatably adjustably engage said saddle member, said pivot end having clamp engaging means thereon, adjustable clamping means engaging the outer surface of the post, and engaging said means on said pivot end, for positioning the saddle and pivot end longitudinally on the post and for rotatably adjustably positioning said pivot end in said groove.

2. In an adjustable mechanism for securing arms to as post as defined in claim 13, said bridge member firmly means connecting the second arm to the post and a bridge member connecting the arms mounted remote from the post.

3. In an adjustable mechanism for securing arms to a post as defined in claim 1, means engaging the post for supporting a second arm on the post, and a bridge member engaging said second arms and connecting them remote from the post.

4. In an adjustable mechanism for securing arms to a post as defined in claim 3, said bridge member firmly engaging one arm and slidably engaging the other arm.

5. In an adjustable mechanism for securing arms to a post as defined in claim 1, complementary angle markings on the saddle and pivot end.

References Cited

UNITED STATES PATENTS

| 185,155 | 12/1876 | Arkenberg | 287—93 |
| 691,728 | 1/1902 | Norfolk | 287—92 X |
| 914,387 | 3/1909 | Crago | 248—230 |
| 2,447,228 | 8/1948 | Boston | 248—221 |

FOREIGN PATENTS

| 537,717 | 3/1957 | Canada. |
| 631,447 | 9/1927 | France. |

CARL W. TOMLIN, *Primary Examiner.*

D. W. AROLA, *Assistant Examiner.*